United States Patent
Uchida

(10) Patent No.: US 7,949,940 B2
(45) Date of Patent: May 24, 2011

(54) PROGRAM AND METHOD FOR RESTRICTING DATA ENTRY

(75) Inventor: Masaru Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 10/864,536

(22) Filed: Jun. 9, 2004

(65) Prior Publication Data

US 2005/0034032 A1 Feb. 10, 2005

(30) Foreign Application Priority Data

Aug. 8, 2003 (JP) .................................. 2003-206627

(51) Int. Cl.
*G06F 17/40* (2006.01)
*G06F 3/00* (2006.01)

(52) U.S. Cl. ........ 715/234; 715/209; 715/206; 715/207; 715/221; 715/224; 715/250

(58) Field of Classification Search .................. 715/514, 715/515, 209, 250, 206, 207, 221, 234; 709/206, 709/207; 707/2
See application file for complete search history.

(56) References Cited

U.S. PATENT DOCUMENTS

| | | | |
|---|---|---|---|
| 6,604,099 B1* | 8/2003 | Chung et al. ...................... 707/3 |
| 6,633,855 B1* | 10/2003 | Auvenshine .................... 706/15 |
| 6,643,818 B1* | 11/2003 | Valk .............................. 714/776 |
| 6,772,196 B1* | 8/2004 | Kirsch et al. .................. 709/206 |
| 7,490,128 B1* | 2/2009 | White et al. ................... 709/206 |
| 2002/0099735 A1* | 7/2002 | Schroeder et al. ............ 707/513 |
| 2002/0116629 A1* | 8/2002 | Bantz et al. ................... 713/200 |
| 2003/0009572 A1* | 1/2003 | Thurner ........................ 709/230 |
| 2003/0101268 A1* | 5/2003 | Davidson et al. ............. 709/227 |
| 2004/0078326 A1* | 4/2004 | Strydom et al. ................. 705/39 |
| 2004/0158630 A1* | 8/2004 | Chang et al. .................. 709/224 |
| 2004/0224297 A1* | 11/2004 | Schwarzschild ............. 434/353 |

FOREIGN PATENT DOCUMENTS

| | | |
|---|---|---|
| JP | 2002-016633 | 1/2002 |
| JP | 2002-269040 | 9/2002 |
| JP | 2002-342143 | 11/2002 |
| JP | 2003-091649 | 3/2003 |

OTHER PUBLICATIONS

Morrison, "XML Unleashed", Dec. 21, 1999, pp. WP1, WP2.*
Stearns, "Adaptive Firewalls with Iptables", published: 2002, pp. 1-5.*
Ichiro Shinohara, "Hands-on Introduction to XML," 4th Verify XML document using DTD, Nikkei Open System, No. 100, Nikkei Open Systems, Japan, Nikkei Business Publications, Inc., Jul. 15, 2001, p. 198-205. (In Japanese with English language Abstract).

* cited by examiner

*Primary Examiner* — Stephen S. Hong
*Assistant Examiner* — Wilson Tsui
(74) *Attorney, Agent, or Firm* — Greer, Burns & Crain, Ltd.

(57) ABSTRACT

A data entry restriction program capable of rejecting invalid structured documents out of structured documents of a general-purpose format with great flexibility. When a structured document is entered, a data entry restriction apparatus compares the structure of the structured document with flexibility requirements (step S1). When the structured document does not meet the flexibility requirements, the data entry restriction apparatus records error information in association with the sending client of the document (step S2). After the error information associated with the client exceeds prescribed limits, the data entry restriction apparatus rejects structured documents from the client (step S3). Structured documents which meet the flexibility requirements and the data entry restriction apparatus has accepted are entered into a data processing apparatus and analyzed (step S4).

9 Claims, 17 Drawing Sheets

331 REQUIREMENTS TABLE

| ITEMS | ALLOWABLE RANGES |
|---|---|
| DOCUMENT SIZE | 1 MB OR LESS |
| NUMBER OF CONTINUOUS BLANK CHARACTERS | 100 CHARACTERS OR LESS |
| LENGTH OF COMMENTS | 200 CHARACTERS OR LESS |
| LENGTH OF TARGET NAME OF PROCESSING INSTRUCTIONS | 100 CHARACTERS OR LESS |
| LENGTH OF PROCESSING INSTRUCTIONS | 200 CHARACTERS OR LESS |
| LENGTH OF ELEMENT NAME | 100 CHARACTERS OR LESS |
| NUMBER OF ATTRIBUTES THAT ELEMENT HAS | 50 OR LESS |
| LENGTH OF ATTRIBUTE NAME | 100 CHARACTERS OR LESS |
| LENGTH OF ATTRIBUTE VALUE | 100 CHARACTERS OR LESS |
| LENGTH OF CONTENTS OF CONTINUOUS CHARACTER DATA AND CDATA SECTION | 10,000 CHARACTERS OR LESS |
| NUMBER OF CHILD NODES THAT ELEMENT HAS | 100 OR LESS |
| DEPTH OF ELEMENT NESTING | 10 LAYERS OR LESS |
| DTD | NO-DTD |

FIG. 7

```
<?xml version="1.0" encoding="Shift_JIS" standalone="no"?>
<?xml-stylesheet type="text/xsl" href="catalog.xsl"?>
<!DOCTYPE root
  [
  <!ELEMENT element (element*)>
  <!ATTLIST book isdn NMTOKEN #REQUIRED>
  ]>
<root>
<element0000000000000000000......00 0/>
<element value="value00000......0000"/>

<element value="value"    ............/>
 . . . . . . .
</root>
```

- 50a UNNECESSARY DTD
- 50b TOO LONG ELEMENT NAME
- 50c TOO LONG ATTRIBUTE VALUE
- 50d TOO LONG BLANK CHARACTERS
- 50e TOO LARGE XML DOCUMENT

FIG. 8

341 ERROR LOG

| CLIENT IP ADDRESSES | DETAILS OF ERRORS |
|---|---|
| 10.124.50.101 | INVALID LENGTH OF ELEMENT NAME |
| 10.74.173.120 | INVALID LENGTH OF ATTRIBUTE NAME |
| 10.31.221.51 | INVALID LENGTH OF COMMENTS |
| 10.35.86.66 | INVALID DOCUMENT SIZE |

431 REQUIREMENTS TABLE

| ITEMS | ALLOWABLE RANGES | AGGRESSION POINTS |
|---|---|---|
| DOCUMENT SIZE | 1 MB OR LESS | 5 |
| NUMBER OF CONTINUOUS BLANK CHARACTERS | 100 CHARACTERS OR LESS | 5 |
| LENGTH OF COMMENTS | 200 CHARACTERS OR LESS | 3 |
| LENGTH OF TARGET NAME OF PROCESSING INSTRUCTIONS | 100 CHARACTERS OR LESS | 3 |
| LENGTH OF PROCESSING INSTRUCTIONS | 200 CHARACTERS OR LESS | 3 |
| LENGTH OF ELEMENT NAME | 100 CHARACTERS OR LESS | 3 |
| NUMBER OF ATTRIBUTES THAT ELEMENT HAS | 50 OR LESS | 3 |
| LENGTH OF ATTRIBUTE NAME | 100 CHARACTERS OR LESS | 3 |
| LENGTH OF ATTRIBUTE VALUE | 100 CHARACTERS OR LESS | 3 |
| LENGTH OF CONTENTS OF CONTINUOUS CHARACTER DATA AND CDATA SECTION | 10,000 CHARACTERS OR LESS | 3 |
| NUMBER OF CHILD NODES THAT ELEMENT HAS | 100 OR LESS | 3 |
| DEPTH OF ELEMENT NESTING | 10 LAYERS OR LESS | 3 |
| ATTRIBUTE VALUE | FOLLOW ACCEPTABLE FORMAT | 1 |
| TEXT VALUE IN ELEMENT | FOLLOW ACCEPTABLE FORMAT | 1 |

441 ERROR LOG

| CLIENT IP ADDRESSES | DETAILS OF ERRORS | AGGRESSION POINTS |
| --- | --- | --- |
| 10.35.86.66 | INVALID LENGTH OF ELEMENT NAME | 3 |
| 10.124.50.101 | INVALID LENGTH OF ELEMENT NAME | 3 |
| 10.35.86.66 | INVALID LENGTH OF COMMENTS | 3 |
| 10.74.173.120 | INVALID LENGTH OF ATTRIBUTE NAME | 3 |
| 10.171.209.57 | INVALID ATTRIBUTE VALUE | 1 |
| 10.31.221.51 | INVALID LENGTH OF COMMENTS | 3 |
| 10.35.86.63 | INVALID DOCUMENT SIZE | 5 |
| 10.25.160.229 | INVALID TEXT VALUE IN ELEMENT | 1 |

FIG. 13

442 AGGRESSION SCORE TABLE

| CLIENT IP ADDRESSES | AGGRESSION SCORES |
|---|---|
| 10.35.86.66 | 6 |
| 10.124.50.101 | 3 |
| 10.74.173.120 | 3 |
| 10.171.209.57 | 1 |
| 10.31.221.51 | 3 |
| 10.35.86.63 | 5 |
| 10.25.160.229 | 1 |

FIG. 14

441 ERROR LOG

| CLIENT IP ADDRESSES | DETAILS OF ERRORS | AGGRESSION POINTS |
|---|---|---|
| 10.35.86.66 | INVALID LENGTH OF ELEMENT NAME | 3 |
| 10.124.50.101 | INVALID LENGTH OF ELEMENT NAME | 3 |
| 10.35.86.66 | INVALID LENGTH OF COMMENTS | 3 |
| 10.74.173.120 | INVALID LENGTH OF ATTRIBUTE NAME | 3 |
| 10.171.209.57 | INVALID ATTRIBUTE VALUE | 1 |
| 10.31.221.51 | INVALID LENGTH OF COMMENTS | 3 |
| 10.35.86.63 | INVALID DOCUMENT SIZE | 5 |
| 10.25.160.229 | INVALID TEXT VALUE IN ELEMENT | 1 |
| 10.35.86.66 | INVALID LENGTH OF ELEMENT NAME | 3 |
| 10.35.86.66 | INVALID ATTRIBUTE VALUE | 1 |

FIG. 16

PROGRAM AND METHOD FOR RESTRICTING DATA ENTRY

CROSS-REFERENCE TO RELATED APPLICATIONS

This application is based upon and claims priority of Japanese Patent Application No. 2003-206627, filed on Aug. 8, 2003, the contents being incorporated herein by reference.

BACKGROUND OF THE INVENTION (1) Field of the Invention

This invention relates to a data entry restriction program and method for determining whether to accept or reject structured documents, and more particularly, to a data entry restriction program and method for determining whether to accept or reject structured documents with great flexibility.

(2) Description of the Related Art

Structured documents may be used to exchange information over the Internet. Using structured documents is an easy way to process elements in the documents because their structure can be analyzed at the time of reception. For example, character strings in prescribed items can be registered in databases easily.

Some structured documents are in general-purpose formats with great flexibility. In many situations, such structured documents are employed as data formats acceptable by processing systems because of easy data creation. Specifically, Standard Generalized Markup Language (SGML), Hyper Text Markup Language (HTML) and extensible Markup Language (XML), which are generally used, have an advantage that clients can create data easily. In addition, these have another advantage that processing system sides can analyze data easily by using generally-distributed analysis modules.

By the way, with the recent development of the Internet, more systems can accept data of general-purpose formats with great flexibility over the Internet. Specifically, this trend for the XML is strong. For example, in order to communicate secure electronic documents, systems to create the documents in XML have been proposed (for example, refer to Japanese Patent Application Laid-Open No. 2003-91649).

SUMMARY OF THE INVENTION

This invention provides a data entry restriction program for determining whether to accept or reject entered structured documents. This data entry restriction program causes a computer to execute the following steps: (a) comparing a structure of a structured document to previously defined flexibility requirements indicating allowable ranges for document structure; (b) recording error information in association with the sending client of the structured document when the structured document does not meet the flexibility requirements; and (c) rejecting structured documents from the client after the error information associated with the client exceeds prescribed limits.

In addition, provided is a data entry restriction method for determining whether to accept or reject entered structured documents. This data entry restriction method comprises the following steps: (a) comparing structure of a structured document to previously defined flexibility requirements indicating allowable ranges for document structure; (b) recording error information in association with the sending client of the structured document when the structured document does not meet the flexibility requirements; and (c) rejecting structured documents from the client after the error information associated with the client exceeds prescribed limits.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example of a data structure of a requirements table;

FIG. 8 shows an example of check items of XML documents;

FIG. 9 shows an example of a data structure of an error log;

FIG. 12 shows an example of a data structure of a requirements table according to the third embodiment;

FIG. 13 shows an example of a data structure of an error log according to the third embodiment;

FIG. 14 shows an example of a data structure of an aggression score table;

FIG. 16 shows an example of an updated error log; and

DESCRIPTION OF THE PREFERRED EMBODIMENTS

In the Internet environment, not all clients send valid data. Environments for communication of XML data with great flexibility have weak defense against attacks from malignant third parties. For example, a malignant third party makes use of the great flexibility and may increase loads in a data processing program of a server side by sending invalid structured documents. In addition, a possibility of creation of a security hole is higher as flexibility is greater. If a malignant third party targets a security hole, the system is taken over in the worst case.

To prevent such cases, only data analysis to confirm whether data is in a prescribed format is not sufficient, and a mechanism to avoid attacks from devious clients by limiting flexibility is required.

In view of foregoing, an object of this invention is to provide a data entry restriction program and method which are capable of rejecting invalid structured documents out of structured documents of a general-purpose format with great flexibility.

Preferred embodiments of this invention will be described with reference to the accompanying drawings.

The following description will first outline the invention and then give more specific explanation for how the invention will be implemented. A computer running a data entry restriction program according to this invention is referred to as a data entry restriction apparatus.

Figure 1:
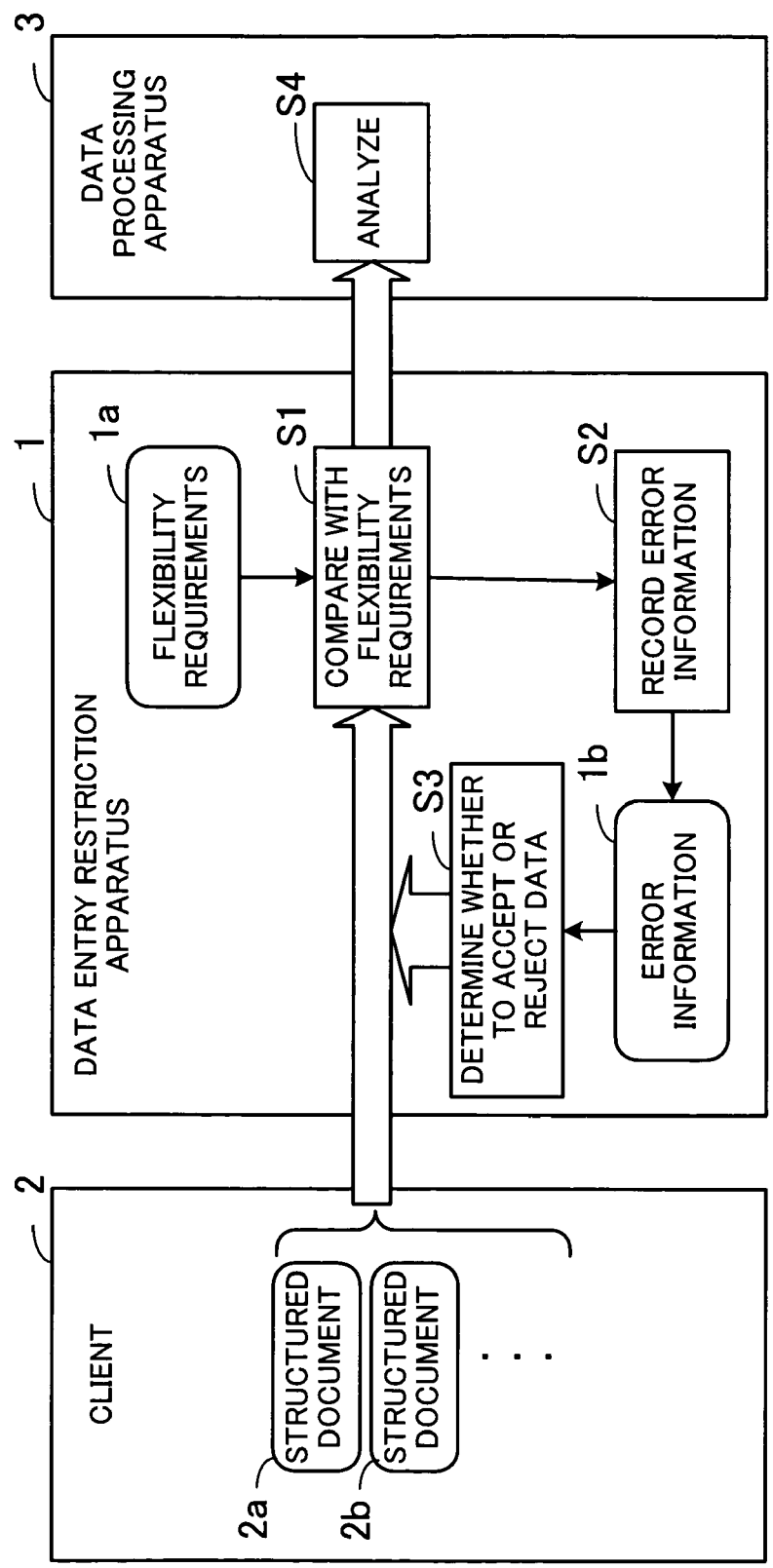
FIG. 1 is a conceptual view of this invention applied to the embodiment.

FIG. 1 is a conceptual view of this invention applied to this embodiment. The data entry restriction apparatus 1 is arranged between a client 2 and a data processing apparatus 3. The client 2 is a computer for entering structured documents 2a, 2b, . . . into the data processing apparatus 3. The data processing apparatus 3 analyzes the structure of the received structured documents and performs prescribed processes (for example, registration of information of prescribed items in databases).

The data entry restriction apparatus 1 checks the flexibility of the structured documents 2a, 2b, . . . that the client 2 sent to the data processing apparatus 3, and discards structured documents exceeding flexibility restrictions before the documents are entered into the data processing apparatus 3. For this process, the data entry restriction apparatus 1 previously stores defined flexibility requirements 1a indicating allowable ranges for document structure. The data entry restriction apparatus 1 performs the following process when receiving the structured documents 2a, 2b, . . . .

When the data entry restriction apparatus 1 receives the structured document 2a, it compares the structure of the structured document 2a with the flexibility requirements 1a (step S1). When the structured document 2a does not meet the flexibility requirements 1a, the data entry restriction apparatus 1 records error information 1b in association with the sending client 2 of the received structured document (step S2). After the error information 1b associated with the client 2 exceeds prescribed limits, the data entry restriction apparatus 1 rejects the structured document 2b from the client 2 (step S3). Structured documents which meet the flexibility requirements 1a and the data entry restriction apparatus 1 does not reject are entered into the data processing apparatus 3 and analyzed (step S4).

The data entry restriction apparatus 1 is provided with a function to check the flexibility of structured documents and a function to determine based on past error information 1b whether to accept or reject connections. When the data entry restriction apparatus 1 receives a structured document from the client 2, it determines based on the past error information 1b whether to accept the connection. When the apparatus 1 decides to reject the connection, the structured document is not entered into the data processing apparatus 3. When the apparatus 1 decides to accept the connection, on the contrary, it determines whether the structured document meets the previously defined flexibility requirements 1a. When the structured document does not meet the flexibility requirements 1a, it is not entered into the data processing apparatus 3. At this time, error information 1b is recorded. When the structured document is identified valid, on the contrary, this document is transferred to the data processing apparatus 3.

With the above method, even when attackers make use of the flexibility of a data format and send data, unexpected errors such as overflow in the data processing apparatus 3 can be prevented. In addition, errors can be detected before data is entered into the data processing apparatus 3 having heavy processing loads. Therefore, attacks made by continuously sending invalid data from attackers can be prevented.

As the flexibility requirements 1a, various restrictions on the data structure of structured documents are defined. As the restrictions on items with flexibility of the format, such as length and the number of times of appearance, threshold values that should be satisfied are defined. In the case of XML documents, the following items (indicated by item names in parenthesis) can be items of the flexibility requirements.

the size of XML document the length of continuous blank characters the lengths of names (element name, attribute name, target name of processing instructions, entity name, notation name)

the lengths of values (the contents of comments, the contents of processing instructions, the contents of continuous character data and CDATA section, attribute value, element content model in element type declaration, default value declared by #FIXED keyword in attribute list declaration, replacement text in entity declaration, system identifier, public identifier, the length of contents of section with conditions in which a keyword in document type definition (DTD) is IGNORE.

The number of times of appearance (the number of attributes that an element has, the number of child nodes that an element has, the depth of element nesting, DTD, parameter entity reference).

That is, XML has no restrictions on above items in its specification. Therefore, existing XML parsers cannot detect errors regarding the above items, so that it processes unwanted data having unallowable length and number of times of appearance. By using a flexibility check module to take invalid XML documents having an unallowable length or number of times of appearance as errors, the process of the XML documents can be stopped before the XML documents are entered into an analysis module.

In addition, clients who send such data can be identified as devious clients. In this case, an attack area can be limited by rejecting data from the clients.

Preferred embodiments of this invention will be described by using XML documents as an example.

First Embodiment

The first embodiment will be now described. This embodiment is arranged to reject connections from a client after the client causes errors by XML documents a prescribed number of times or more.

Figure 2:
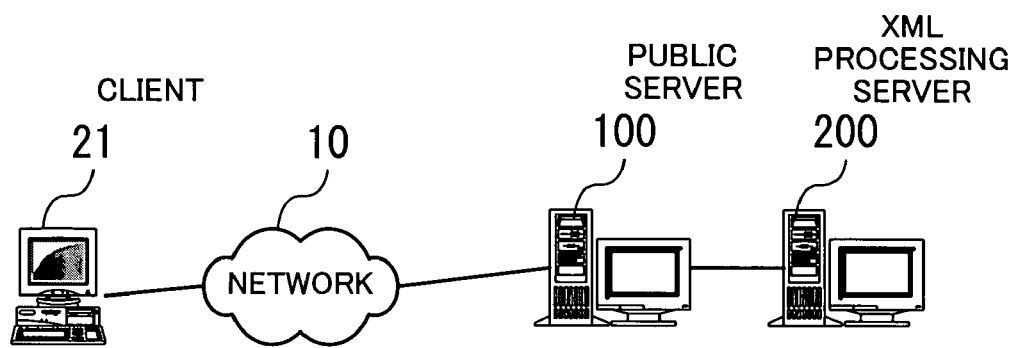
FIG. 2 shows an example of a system structure in the embodiment of this invention.

FIG. 2 shows an example of a system structure of this first embodiment of this invention. In this embodiment, a client 21 and a public server 100 are connected to each other via a network 10. The network 10 is the Internet, for example. The public server 100 and an XML processing server 200 are connected to each other.

The client 21 is a computer that a user uses. The client 21 sends XML documents to the public server 100 over the network 10 according to user operation. The public server 100 determines whether to accept or reject the XML documents from the client 21, and transfers only allowed XML documents to the XML processing server 200. The XML processing server 200 analyzes the document structure of the received XML documents and executes prescribed processes.

Figure 3:
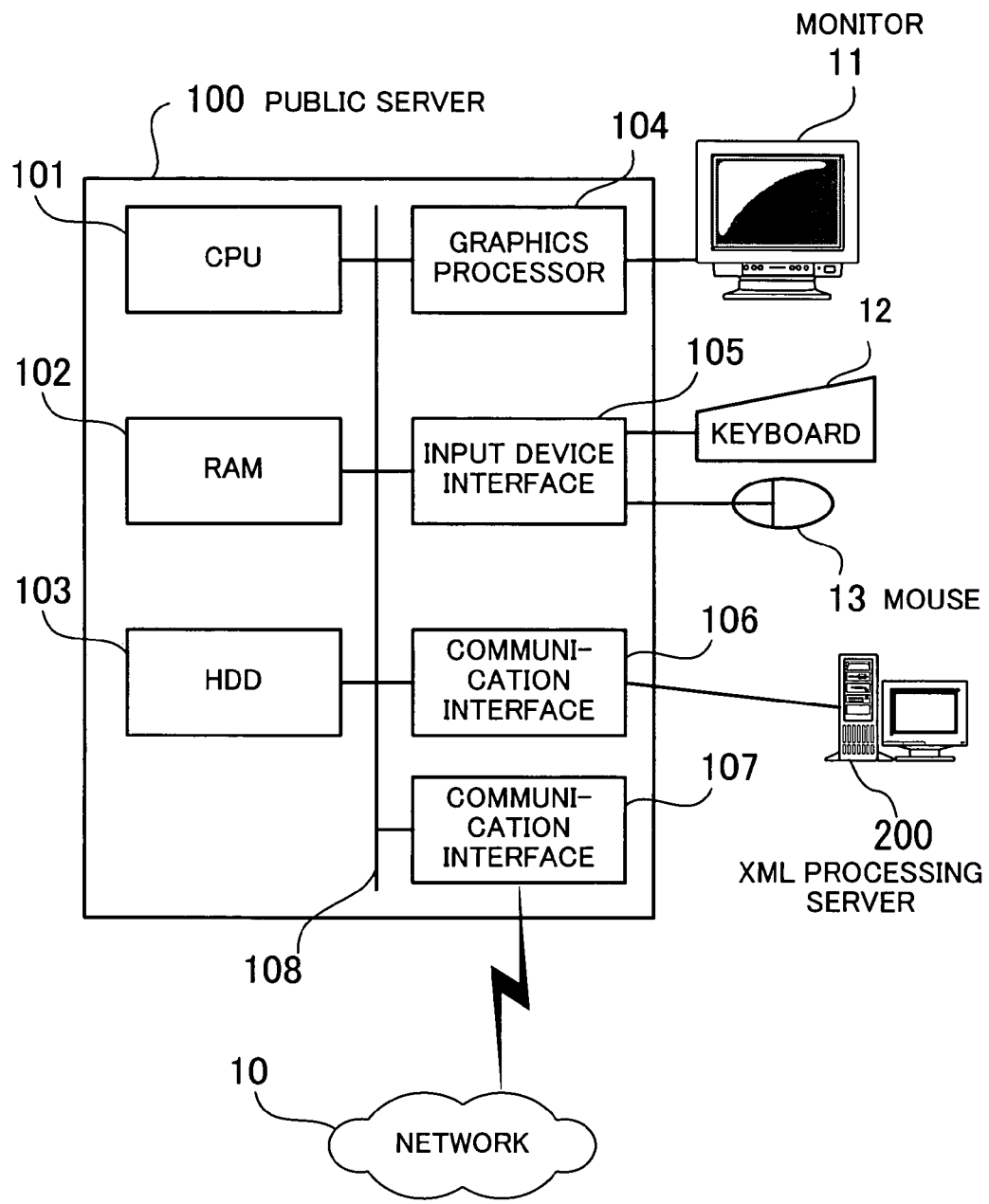
FIG. 3 shows an example of a hardware structure of a computer used in the embodiment of this invention.

FIG. 3 shows an example of a hardware structure of the public server in the embodiment of this invention. This public server 100 is entirely controlled by a central processing unit (CPU) 101. Connected to the CPU 101 are a random access memory (RAM) 102, a hard disk drive (HDD) 103, a graphics processor 104, an input device interface 105 and communication interfaces 106 and 107 via a bus 108.

The RAM 102 temporarily stores at least part of an operating system (OS) program and application programs which are executed by the CPU 101. The RAM 102 stores various kinds of data required for CPU processing. The HDD 103 stores the OS and application programs.

The graphics processor 104 is connected to a monitor 11 to display images on the monitor 11 under the control of the CPU 101. The input device interface 105 is connected to a keyboard 12 and a mouse 13. The input device interface 105 transfers signals from the keyboard 12 and the mouse 13 to the CPU 101 via the bus 108.

The communication interface 106 is connected to the XML processing server 200 to communicate data with this server 200.

The communication interface 107 is connected to the network 10 to communicate data with other computers over the network 10.

With such a hardware structure, the processing functions of this embodiment can be realized. It should be noted that the client 21 and the XML processing server 200 can also have the same hardware structure of FIG. 3 as the public server 100.

Figure 4:
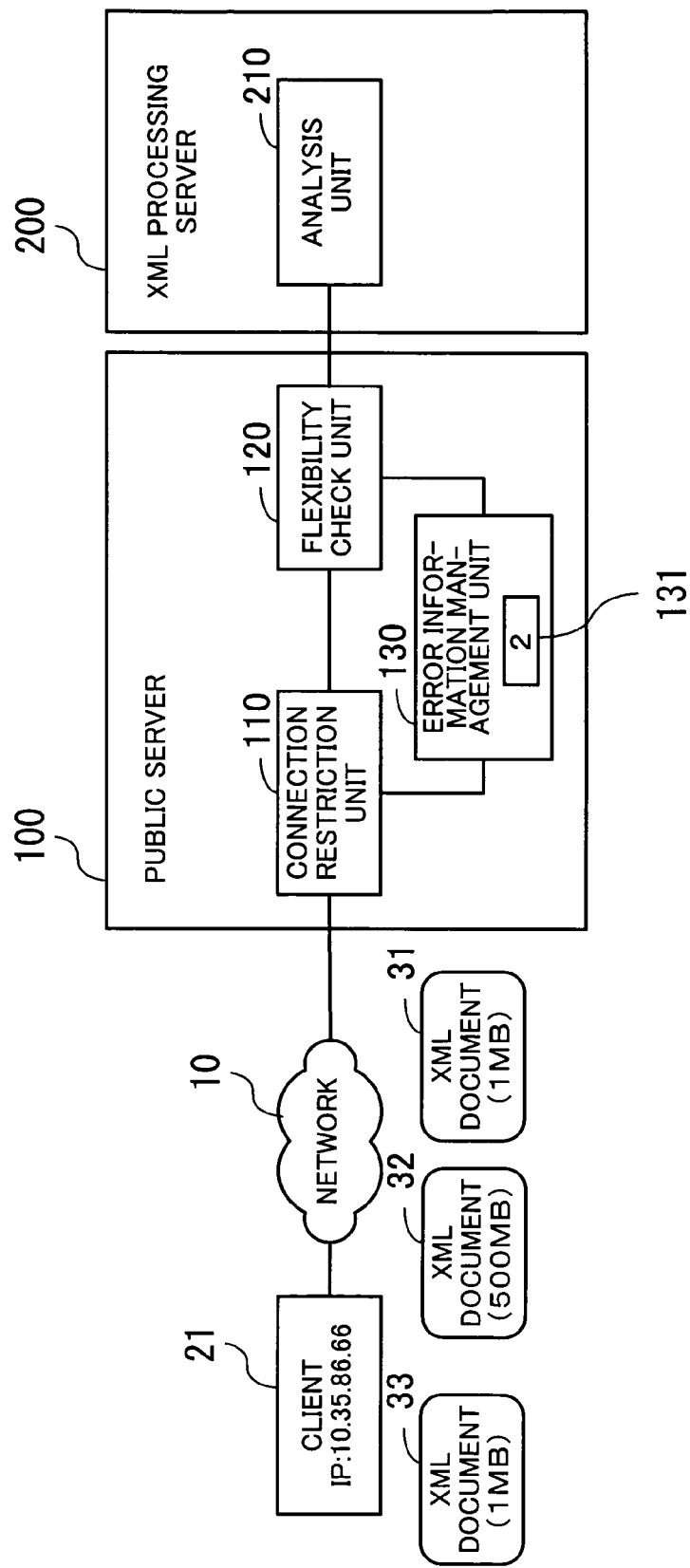
FIG. 4 is a block diagram showing a configuration of a first embodiment.

FIG. 4 is a block diagram showing a configuration in the first embodiment. In this example of FIG. 4, the client 21 sends a plurality of XML documents 31 to 33 to the public server 100. The data sizes of the XML documents 31, 32, and 33 are taken to 1 MB, 500 MBs, and 1 MB, respectively. In addition, the client 21 is assigned an IP address "10.35.86.66".

The public server 100 executes prescribed processes based on a prescribed program composed of a plurality of modules. In this public server 100, a connection restriction unit 110, a flexibility check unit 120, and an error information management unit 130 are established in correspondence with the modules.

The connection restriction unit 110 determines based on past error information whether to accept or reject received data. For example, data is rejected after three or more errors are created in the flexibility check unit 120. The connection restriction unit 110 is a function which is realized by performing a connection restriction module by the public server 100. Specifically, when the connection restriction unit 110 receives XML documents 31 to 33 from the client 21, it determines whether to accept or reject the XML document, depending on whether the IP address of the client 21 has been registered in the error information management unit 130 and whether the number of errors corresponding to the IP address is three or more times. When the IP address has been registered and the corresponding number of errors is three or more times, the connection restriction unit 110 rejects the access from the client 21. That is, the connection restriction unit 110 discards the XML document without analyzing its contents.

The flexibility check unit 120 checks accepted XML documents based on previously defined flexibility requirements information. The flexibility check unit 120 is a function which is realized by executing a flexibility check module by the public server 100. Specifically, a restriction on document size is defined as the flexibility requirements information. The flexibility check unit 120 determines whether a received XML document 31 to 33 satisfies the flexibility requirements information (whether it is within the restriction defined in the information). In this example, the restriction on the document size is taken to be 10 MBs. In this case, XML documents of less than 10 MBs satisfy the flexibility requirements information. In other words, XML documents of 10 MBs or more do not.

Restrictions on a plurality of items can be set. In this case, XML documents within all of the restrictions satisfy the flexibility requirements information. XML documents which exceed at least one of the restrictions do not satisfy the flexibility requirements information.

The flexibility check unit 120 transfers accepted XML documents to the XML processing server 200. As to XML documents which exceed at least one of the restrictions, the flexibility check unit 120 makes error notification to the error information management unit 130 and the client 21.

The error information management unit 130 manages the number of errors caused by XML documents sent from the client 21. The error information management unit 130 is a function which is realized by executing an error management module by the public server 100. Specifically, the error information management unit 130 has a counter 131 for counting the number of errors caused by XML documents sent from the client 21. When the error information management unit 130 receives error notification, the counter 131 increases the number of errors.

The XML processing server 200 is provided with an analysis unit 210. The XML processing server 200 receives the XML documents 31 to 33 from the public server 100 with the analysis unit 210.

The analysis unit 210 analyzes the document structure of received XML documents based on the XML specification. The analysis unit 210 is a function which is realized by executing an analysis module by the XML processing server 200. Specifically, the analysis unit 210 analyzes the data structure of XML documents received from the flexibility check unit 120 based on the tags of the documents. Then the analysis unit 210 executes prescribed processes such as registration of data set in prescribed tags in databases.

With the XML processing server 200 having such configuration, XML documents over the network 10 can be accepted and processed safely.

Figure 5:
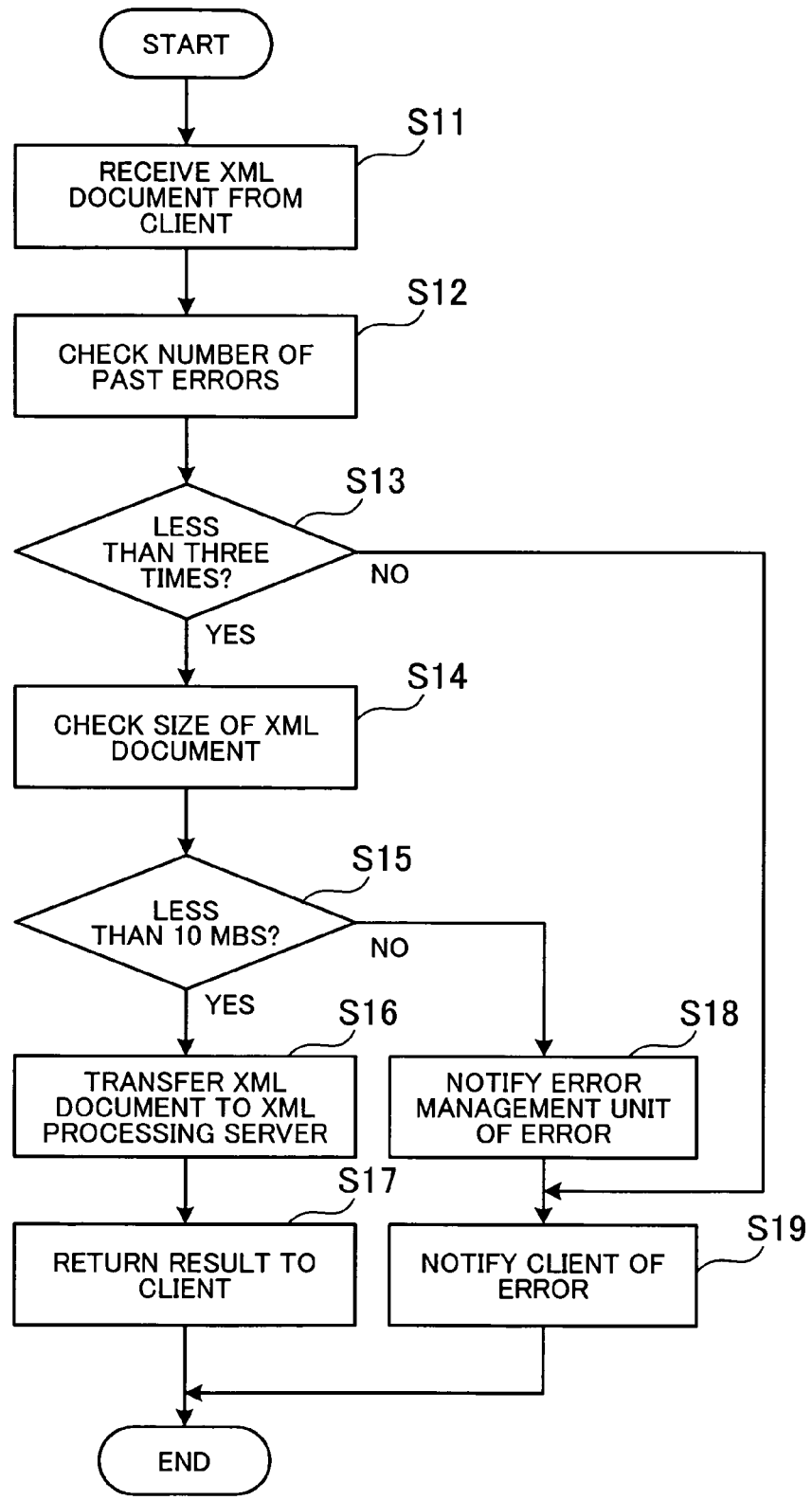
FIG. 5 is a flowchart showing a procedure of a process by an XML server.

FIG. 5 is a flowchart showing a procedure of a process by the XML processing server. This procedure of FIG. 5 will be described based on step numbers. The procedure starts when the client 21 sends an XML document to the public server 100.

[Step S11] In the public server 100, the connection restriction unit 110 receives the XML document from the client 21.

[Step S12] The connection restriction unit 110 refers to the counter 131 in the error information management unit 130 to detect the number of errors caused by past XML documents sent from the client 21.

[Step S13] The connection restriction unit 110 determines whether the number of errors relating to the client 21 is less than three times. When it is less than three times, the connection restriction unit 110 gives the XML document to the flexibility check unit 120 and the process goes on to step S14. When it is three or more times, the process goes on to step S19.

[Step S14] The flexibility check unit 120 checks the size of the XML document by analyzing header information or the like.

[Step S15] The flexibility check unit 120 determines whether the size of the XML document is less than 10 MBs. For example, the XML document 31 is confirmed to be less than 10 MBs. The XML document 32 is confirmed to be 10 MBs or more. When the size is less than 10 MBs, the flexibility check unit 120 transfers the XML document to the analysis unit 210 and the process goes on to step S16. When the size is 10 MBs or more, the process goes on to step S18.

[Step S16] The flexibility check unit 120 transfers the XML document to the XML processing server 200. The analysis unit 210 of the XML processing server 200 analyzes the XML document and executes processes suitable for the contents of the XML document.

[Step S17] The analysis unit 210 returns a processing result to the client 21. Then this procedure ends.

[Step S18] The flexibility check unit 120 makes error notification to the error information management unit 130. The error information management unit 130 increases the number of errors indicated by the counter 131.

[Step S19] The connection restriction unit 110 or the flexibility check unit 120 notifies the client of the error. Specifically, when the number of errors was confirmed to be three or more times in step S13, the connection restriction unit 110 makes the error notification. When the document size was confirmed to be 10 MBs or more in step S15, the flexibility check unit 120 makes the error notification. Then this procedure ends.

As described above, too large (10 MBs or more) XML documents are discarded by the public server 100 even when their formats are acceptable by the XML processing server 200. In addition, after the number of errors becomes a prescribed number (three times) or more, XML documents from the client 21 are discarded, regardless of document size.

For example, assume that past XML documents from the client 21 caused two errors and then the client 21 sequentially sends the XML document 31 (of 1 MB), XML document 32 (of 500 MBs), and XML document 33 (of 1 MB) to the public server 100.

First the public server 100 receives the XML document 31 of 1 MB from the client 21. The connection restriction unit 110 checks the number of past errors. Since the number of errors is two, i.e., less than three times, the connection restriction unit 110 accepts this XML document 31.

Next the flexibility check unit 120 checks the data size of the XML document 31. Since the size is 1 MB, i.e., less than the restriction of 10 MBs, the XML document 31 is transferred to the analysis unit 210 where it is analyzed. Then the analysis unit 210 performs appropriate processes according to the analysis and returns the result to the client 21.

Then the public server 100 receives the XML document 32 of 500 MBs from the client 21. The connection restriction unit 110 checks the number of past errors. Since the number of past errors is two, i.e., less than three times, the connection restriction unit 120 accepts the XML document 32.

Then the flexibility check unit 120 checks the size of the XML document 32. The size is 500 MBs, i.e., exceeds the restriction of 10 MBs, so that the flexibility check unit 120 discards the XML document 32 and notifies the error information management unit 130 of this error. The error information management unit 130 increases the number of errors regarding to the client 21. At this time, the client is also notified of this error.

Next, the client 21 sends the XML document 33 and the connection restriction unit 110 checks the number of past errors regarding to this client 21. Since three errors already occurred by this time, the connection restriction unit 110 rejects this data and notifies the client 21 of this error.

By rejecting XML documents of which the data sizes are a prescribed size or larger, the XML processing server 200 can prevent the unnecessary reception of too large XML documents. Thus attacks from third parties to the XML processing server 200 can be avoided.

If XML documents are directly entered in the analysis unit 210, the analysis unit 210 analyzes all of the documents, regardless of data size. As a result, too large XML documents may cause overloads in the XML processing server 200 and may not be able to process other valid data promptly. By rejecting XML documents of which the sizes are a prescribed size or larger as described in this embodiment, too large XML documents sent to the public server 10 does not affect the processes of the XML processing server 200.

Second Embodiment

Next the second embodiment will be described. This embodiment is arranged to restrict connections from clients by managing errors for each client based on IP addresses.

Figure 6:
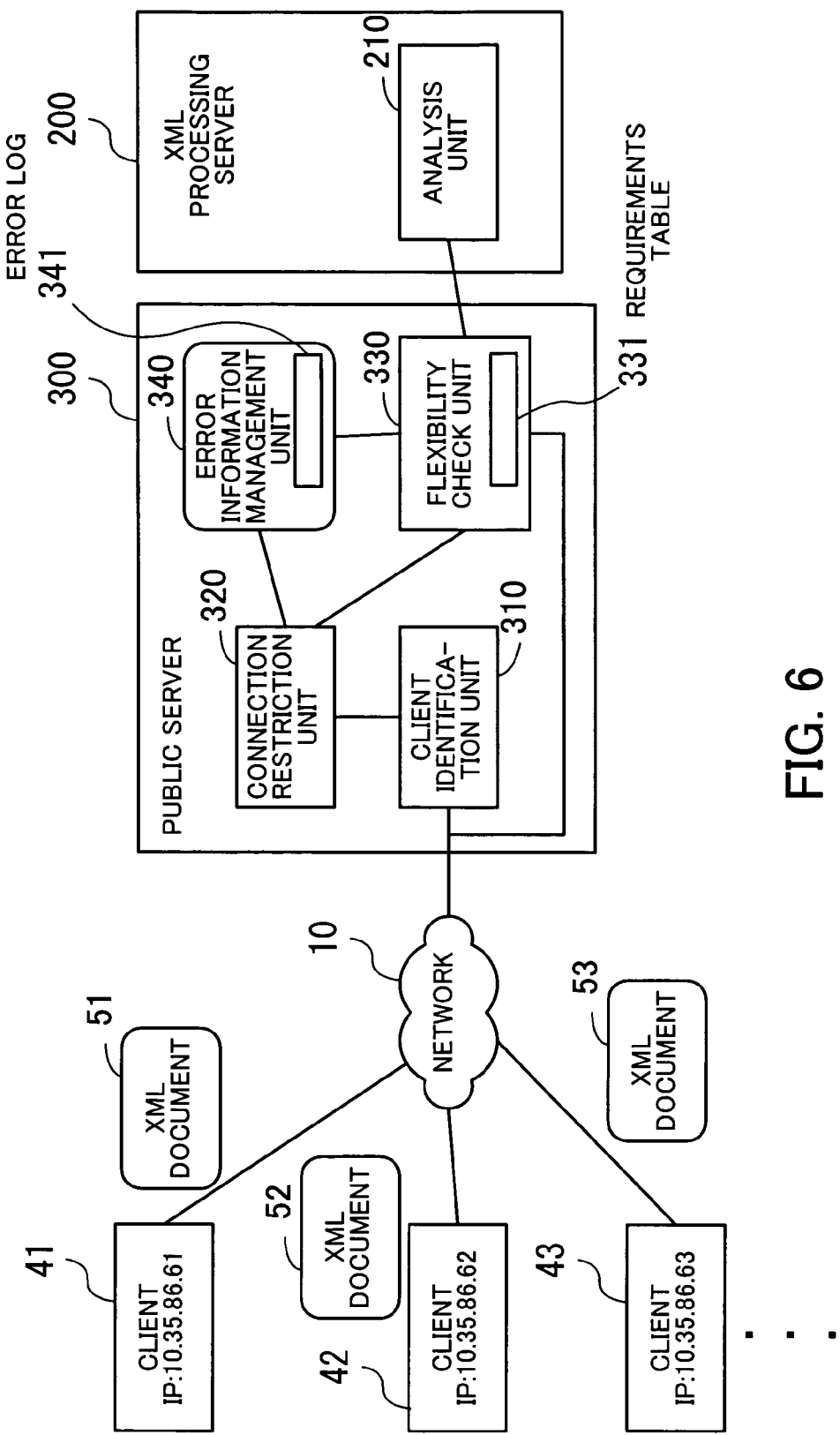
FIG. 6 is a block diagram showing a configuration of a second embodiment.

FIG. 6 is a block diagram showing a configuration of the second embodiment. In this embodiment, a network 10 and an XML processing server 200 have the same functions as those with the same names of the first embodiment. These components are assigned the same reference numerals as the corresponding components of the first embodiment shown in FIG. 4 and detailed description will be omitted.

In the second embodiment, a plurality of clients 41, 42, 43, . . . are connected to the network 10. The clients 41, 42, 43 assigned IP addresses "10.35.86.61", "10.35.86.62", and "10.35.86.63" send XML documents 51, 52, 53, . . . to a public server 300 via the network 10, respectively.

In the public server 300, a client identification unit 310, a connection restriction unit 320, a flexibility check unit 330, and an error information management unit 340 are established by executing corresponding program modules by a computer.

When receiving connection requests for transfer of the XML documents 51, 52, 53, . . . from the clients 41, 42, 43, . . . , the client identification unit 310 identifies the sending clients based on the IP addresses. The client identification unit 310 gives the extracted IP addresses and the XML documents to the connection restriction unit 320.

The connection restriction unit 320 restricts the connections from the clients so as to reject connections from clients of which the IP addresses have been registered in an error log 341. Specifically, when receiving an IP address from the client identification unit 310, the connection restriction unit 320 accesses the error log 341 being managed by the error information management unit 340 to determine whether the received IP address exists. When the IP address has been registered in the error log 341, the connection restriction unit 320 creates an error and rejects the XML document from the client. When the IP address does not exist in the error log 341, on the contrary, the connection restriction unit 320 accepts this XML document and gives the IP address received from the client identification unit 310 to the flexibility check unit 330.

The flexibility check unit 330 has a requirements table 331. This requirements table 331 shows restrictions for flexibility of XML documents. The flexibility check unit 330 receives from the client an XML document that the connection restriction unit 320 has accepted. Then when the received XML document exceeds at least one of the restrictions defined in the requirements table 331, the flexibility check unit 330 creates an error and discards the XML document. When the flexibility check unit 330 creates the error, it gives the IP address received from the connection restriction unit 320 and the details of the error to the error information management unit 340. When the received XML document is within all of the restrictions defined in the requirements table 331, on the contrary, the flexibility check unit 330 transfers the XML document to the analysis unit 210 of the XML processing server 200.

The error information management unit 340 registers the IP address of clients which caused errors and the details of the errors in the error log 341 to manage them. Specifically, when the error information management unit 340 receives an IP address and the details of an error from the flexibility check unit 330, it registers these information in the error log 341. In addition, the error information management unit 340 gives the contents of the error log 341 to the connection restriction unit 320 in response to a request from this unit 320.

FIG. 7 shows an example of a data structure of the requirements table. This requirements table 331 shows restrictions in a form of record in which an item and an allowable range associated with each other are arranged in a row.

The items are check items for flexibility check. The allowable ranges are allowable ranges for each item. When an XML document exceeds the allowable range of an item, this XML document is rejected and discarded.

In this example of FIG. 7, the allowable range for document size is 1 MB or less. The allowable range for the number of continuous blank characters is 100 characters or less. The allowable range for the length of comments is 200 characters or less. The allowable range for the length of a target name of processing instructions is 100 letter or less. The allowable range for the length of processing instructions is 200 characters or less. The allowable range for the length of an element name is 100 characters or less. The allowable range for the number of attributes that an element has is 50 or less. The allowable range for the length of an attribute name is 100 characters or less. The allowable range for the length of an attribute value is 100 characters or less. The allowable range for the length of the contents of continuous character data and a CDATA section is 10,000 characters or less. The allowable range for the number of child nodes that an element has is 100 or less. The allowable range for the depth of an element nesting is 10 layers or less. The allowable range for DTD is no-DTD.

FIG. 8 shows an example of check items in XML documents. In an XML document 50, items are defined by tags. FIG. 8 shows, as an example, an unnecessary DTD 50a, too long element name 50b, too long attribute value 50c, too long blank characters 50d, and too large XML document 50e. Such XML document 50 exceeds the restrictions defined in the requirements table 331, so that its transfer to the XML processing server 200 is rejected by the flexibility check unit 330.

FIG. 9 shows an example of a data structure of the error log. The error log 341 shows error information in a form of record in which a client IP address and the details of an error associated with each other are arranged in a row. The client IP addresses are the IP addresses of the sending clients of error XML documents. The details of errors indicate the details of errors of XML documents sent from clients in association with the IP addresses of the clients.

Referring to FIG. 9, the details of an error corresponding to an IP address "10.124.50.101" are "invalid length of an element name". Similarly, the details of errors corresponding to IP addresses "10.74.173.120", "10.31.221.51", and "10.35.86.66" are "invalid length of an attribute name", "invalid length of comments", and "invalid document size", respectively.

The above system performs the following process.

Figure 10:
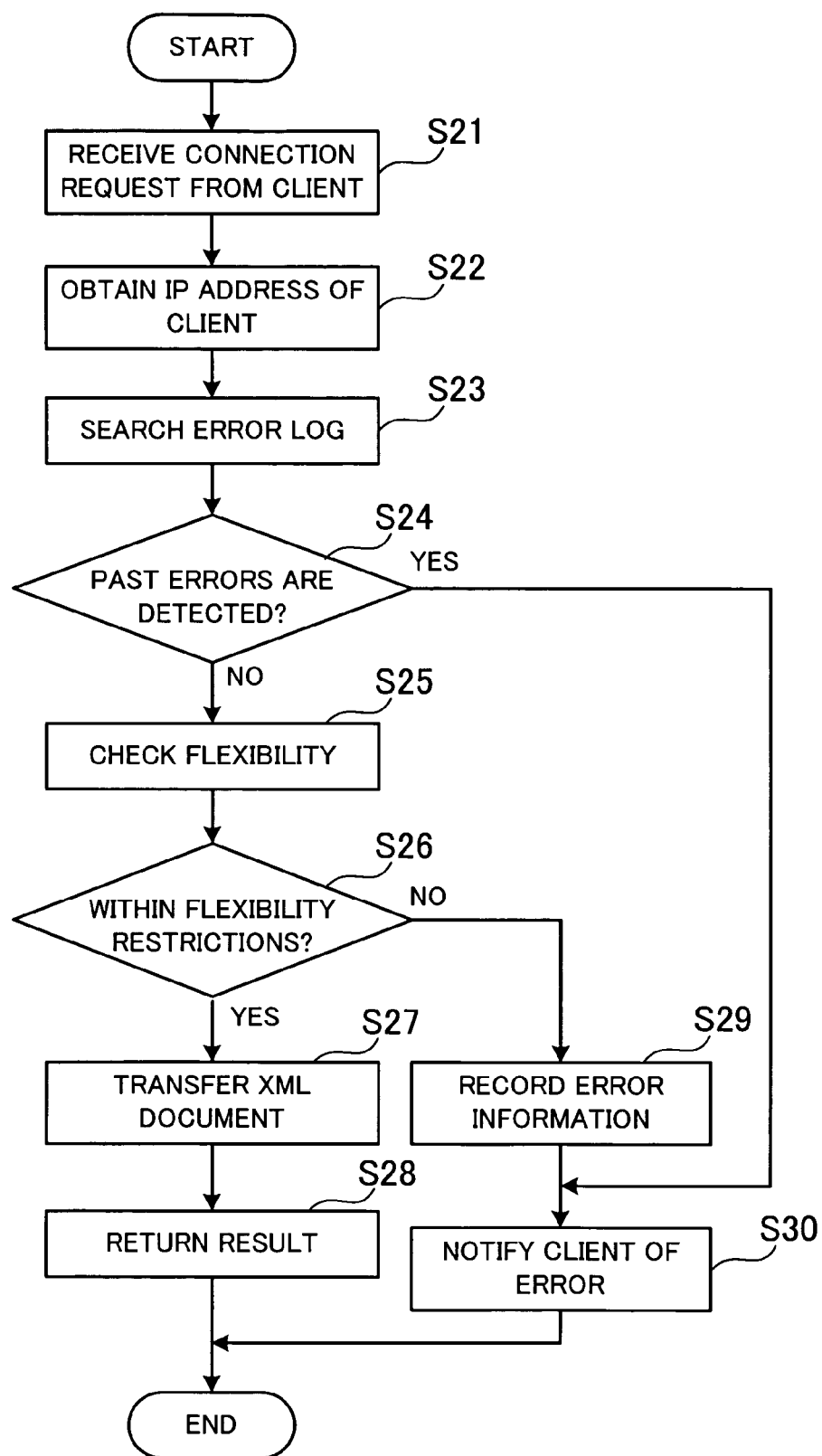
FIG. 10 is a flowchart showing a processing procedure in the second embodiment.

FIG. 10 is a flowchart showing a processing procedure in the second embodiment. This procedure of FIG. 10 will be described based on step numbers.

[Step 21] The client identification unit 310 of the public server 300 receives a connection request for transfer of an XML document from a client.

[Step S22] The client identification unit 310 obtains and gives the IP address of the client to the connection restriction unit 320.

[Step S23] The connection restriction unit 320 obtains the contents of the error log 341 from the error information management unit 340 to search the error log 341 for the IP address received from the client identification unit 310.

[Step S24] When the error log 341 does not contain the IP address, the connection restriction unit 320 determines that no error caused in the past, and the process goes on to step S25. In this case, the connection restriction unit 320 gives the IP address to the flexibility check unit 330. When the error log 341 contains the IP address, on the contrary, the connection restriction unit 320 determines that errors caused in the past, and the process goes on to step S30.

[Step S25] The flexibility check unit 330 receives the XML document from the client and checks the flexibility of the XML document.

[Step S26] The flexibility check unit 330 determines whether the XML document has some items exceeding the restrictions defined in the requirements table 331. When all items are within the restrictions, the process goes on to step S27. When at least one item exceeds the restrictions, the process goes on to step S29.

[Step S27] The flexibility check unit 330 transfers the XML document to the XML processing server 200. Then the XML document is entered into the analysis unit 210 and is analyzed and processed.

[Step S28] The flexibility check unit 330 receives a processing result from the analysis unit 210 and returns it to the client. Then this procedure ends.

[Step S29] Since the flexibility check unit 330 detects violation of the flexibility restrictions, it notifies the error information management unit 340 of the error as well as giving the IP address. The error information management unit 340 records the error information in the error log 341. The error information management unit 340 notifies the connection restriction unit 320 of the error.

[Step S30] The connection restriction unit 320 or the flexibility check unit 330 makes error notification to the client. Specifically, when past errors were confirmed in step S24, the connection restriction unit 320 makes the error notification. When violation of the flexibility restrictions was detected in step S26, the flexibility check unit 330 makes the error notification. Then this procedure ends.

As described above, the public server 300 open to clients accepts connections. Then after a client causes an error once, the same client is prevented from entering XML documents to the XML processing server 200.

Now, assume that the clients 41 and 43 send valid XML documents 51, 53 and the client 42 sends an XML document 52 with an invalid length of an element name (exceeding 100 characters). In addition, assume that, as shown in FIG. 9, the IP addresses of the clients 41 and 42 have not been registered in the error log 341 while the IP address of the client 43 has been registered in the error log 341. The processes of the XML documents 51, 52, 53 by the public server 300 in this situation will be described in detail.

First a process at the time of transmission of the XML document 51 from the client 41 will be described. The client 41 first makes a connection request to the public server 300 over the network 10. The client identification unit 310 obtains the IP address of the client. The connection restriction unit 320 searches the error log 341 for the IP address. Since the error log 341 does not contain the IP address of the client 41, the connection restriction unit 320 allows the connection from the client 41.

The flexibility check unit 330 receives the XML document 51 sent from the client 41 to check the flexibility of the document 51. Since the XML document 51 is within the flexibility restrictions, an error is not detected. The flexibility check unit 330 transfers the XML document 51 to the XML processing server 200. The XML document 51 is analyzed by the analysis unit 210. Since the analysis unit 210 does not detect any error in the XML document 51, it returns a successful result to the public server 300. The public server 300 returns this successful result to the client 41 as well. For example, the flexibility check unit 330 of the public server 300 receives this result from the analysis unit 210 and transfers it to the client 41.

Next a process at the time of transmission of the XML document 52 from the client 42 will be described. The client 42 makes a connection request to the public server 300 over the network 10. The client identification unit 310 obtains the IP address of the client 42. The connection restriction unit 320 searches the error log 341 for the IP address. Since the error log 341 does not contain the IP address of the client 42, the connection restriction unit 320 accepts the connection from the client 42.

The flexibility check unit 330 receives the XML document 52 sent from the client 42 to determine whether the document 52 is within the flexibility restrictions. The flexibility check unit 330 detects an invalid length of an element name in the XML document 52, and notifies the error information management unit 340 of error information including the IP address of the client 42 and the details of the error. The error information management unit 340 records this error information in the error log 341. In addition, the error information management unit 340 returns this error result to the client 42.

Next a process at the time of transmission of the XML document 53 from the client 43 will be described. The client 43 sends a connection request to the public server 300 over the network 10. The client identification unit 310 obtains the IP address of the client 43. The connection restriction unit 320 searches the error log 341 for the IP address. Since the error log 341 contains the IP address of the client 43, the connection restriction unit 320 rejects the connection from the client 43 and returns this error result to the client 43.

As described above, after the IP address of a client is registered in the error log 341, the client is prevented by the public server 300 from entering XML documents into the XML processing server 200. Further, since a flexibility restriction is set for every item of XML documents, malicious transmission of XML documents having unallowable contents to the XML processing server 200 can be detected and the XML documents can be discarded.

Third Embodiment

The third embodiment will be now described. In this third embodiment, an aggression point, or a numeric value indicative of aggression is set to each error in error information. An aggression score which is a total of aggression points is calculated for each client and after the score becomes a prescribed threshold value or greater, connections from the corresponding client are rejected. By doing this, more flexible access control is performed. The basic operation is the same as that of the second embodiment but processes for recording errors and for determining whether to accept or reject connections from clients are unique.

Figure 11:
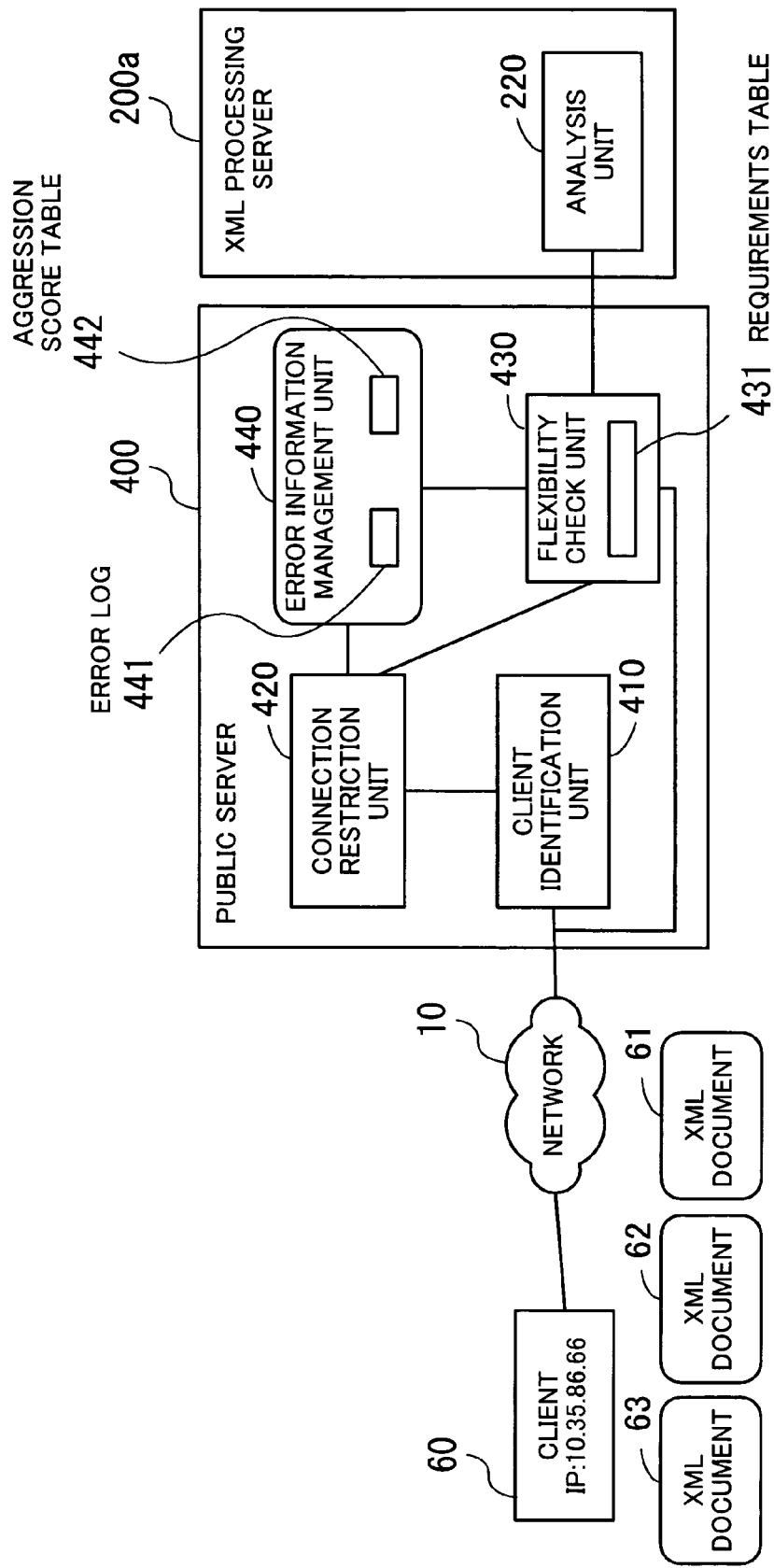
FIG. 11 is a block diagram showing functions in a third embodiment.

FIG. 11 is a block diagram of functions in the third embodiment. In this embodiment, a client 60 sends XML documents 61 to 63 to a public server 400 via a network 10. The client 60 is assigned an IP address of "10.35.86.66". Although only one client is shown in FIG. 11, a plurality of clients can be connected, as in the case of the second embodiment.

In the public server 400, a client identification unit 410, a connection restriction unit 420, a flexibility check unit 430, and an error information management unit 440 are established by executing the corresponding program modules by a computer.

When the client identification unit 410 receives connection requests for transfer of XML documents 61, 62, 63, . . . from the client 60, it identifies the sending clients based on the IP addresses. The client identification unit 410 gives the extracted IP addresses and the XML documents to the connection restriction unit 420.

The connection restriction unit 420 restricts connections from clients so as to reject connections from clients of which the aggression scores are a prescribed value (10 in this embodiment) or greater in an aggression score table 442 of the error information management unit 440.

Specifically, when the connection restriction unit 420 receives an IP address from the client identification unit 410, it searches the aggression score table 442 managed by the error information management unit 440 for the IP address. When the connection restriction unit 420 detects the IP address received from the client identification unit 410, it checks the aggression score of the client based on the IP address. When the aggression score is 10 or greater, the connection restriction unit 420 creates an error and rejects the XML document. When the IP address received from the client identification unit 410 has not been registered in the aggression score table 442 or when the aggression score is less than 10, the connection restriction unit 420 accepts this XML document and gives the flexibility check unit 430 the IP address received from the client identification unit 410.

The flexibility check unit 430 has a requirements table 431. This requirements table 431 shows restrictions for flexibility of XML documents. When the flexibility check unit 430 receives the IP address of a client of which a connection has accepted by the connection restriction unit 420, it receives the XML document from the client. Then the flexibility check unit 430 creates an error and discards the received XML document when the XML document exceeds at least one of the restrictions defined in the requirements table 431. In a case of error, the flexibility check unit 430 gives the IP address received from the connection restriction unit 420, the details of the error, and the corresponding aggression point to the error information management unit 440. When the received XML document is within all of the restrictions defined in the requirements table 431, on the contrary, the flexibility check unit 430 transfers the XML document to the analysis unit 220 of an XML processing server 200a.

The error information management unit 440 registers and manages the IP addresses of clients causing errors, the details of the errors, and the aggression points in the error log 441. In addition, the error information management unit 440 calculates and manages an aggression score by summing aggression points, for each client who caused errors, in an aggression score table 442. Specifically, when the error information management unit 440 receives an IP address, the details of an error, and an aggression point from the flexibility check unit 430, it registers these information in the error log 441. At this time, the error information management unit 440 updates the aggression score table 442. In addition, the error information management unit 440 gives the contents of the aggression score table 442 to the connection restriction unit 420 in response to a request from the unit 420.

The XML processing server 200a is a computer which analyzes XML documents and executes prescribed processes on the XML documents. The XML processing server 200a is provided with the analysis unit 220 to analyze XML documents. When the analysis unit 220 detects an error of document structure in an XML document, it notifies the error information management unit 440 of the public server 400 of the sending IP address of the XML document, the details of the error and the corresponding aggression point.

FIG. 12 is an example of a data structure of the requirements table according to the third embodiment. The requirements table 431 shows restrictions in a form of record in which an item, an allowable range, and an aggression point associated with each other are arranged in a row.

The items are check items for flexibility. The allowable ranges are allowable ranges of the items. The aggression points indicate the levels of damages (aggression) which will be caused by attacks if XML documents exceeding the restrictions are identified as the attacks to the XML processing server 200*a*.

Referring to FIG. 12, the allowable range and aggression point for document size are 1 MB or less and 5. The allowable range and aggression point for the number of continuous blank characters are 100 characters or less and 5. The allowable range and aggression point for the length of comments are 200 characters or less and 3. The allowable range and aggression point for the length of a target name of processing instructions are 100 characters or less and 3. The allowable range and aggression point for the length of processing instructions are 200 characters or less and 3. The allowable range and aggression point for the length of an element name are 100 characters or less and 3. The allowable range and aggression point for the number of attributes that an element has are 50 or less and 3. The allowable range and aggression point for the length of an attribute name are 100 characters or less and 3. The allowable range and aggression point for the length of an attribute value are 100 characters and 3. The allowable range and aggression point for the length of continuous character data and a CDATA section are 10,000 characters or less and 3. The allowable range and aggression point for the number of child nodes that an element has are 100 or less and 3. The allowable range and aggression point for the depth of element nesting is 10 layers or less and 3. The allowable range and aggression point for an attribute value are to follow a format acceptable by the XML processing server 200*a* and 1. The allowable range and aggression point for a text value in an element are to follow a format acceptable by the XML processing server 200*a* and 1.

FIG. 13 is a data structure of the error log according to the third embodiment. The error log 441 shows error information in a form of record in which a client IP address, the details of an error, and an aggression point associated with each other are arranged in a row. The client IP addresses are the IP addresses of sending clients of error XML documents. The details of errors are the details of errors in XML documents sent from clients, in association with the client IP addresses of the clients. The aggression points are aggression points to be added to aggression scores when clients cause errors.

For example, the error details of an IP address "10.35.86.66" are "invalid length of an element name" and its aggression point is "3". This IP address "10.35.86.66" also caused an error of "invalid length of comments", and its aggression point is "3".

FIG. 14 shows an example of a data structure of the aggression score table. This aggression score table 442 shows client IP addresses and their aggression scores. The client IP addresses are the IP addresses of sending clients of error XML documents. The aggression scores indicate the totals of the aggression points of all errors caused by XML documents sent from corresponding clients.

For example, referring to the error log 441 of FIG. 13, the XML documents sent from the client 60 with the IP address "10.35.86.66" caused two errors (invalid length of an element name and invalid length of comments). Therefore, "6" is set in the aggression score table 442 as the aggression score of the client 60 with the IP address "10.35.86.66", which is calculated by adding an aggression point "3" equivalent to the invalid length of an element name and an aggression point "3" equivalent to the invalid length of comments.

A process of the public server 400 according to the third embodiment will be now described.

Figure 15:
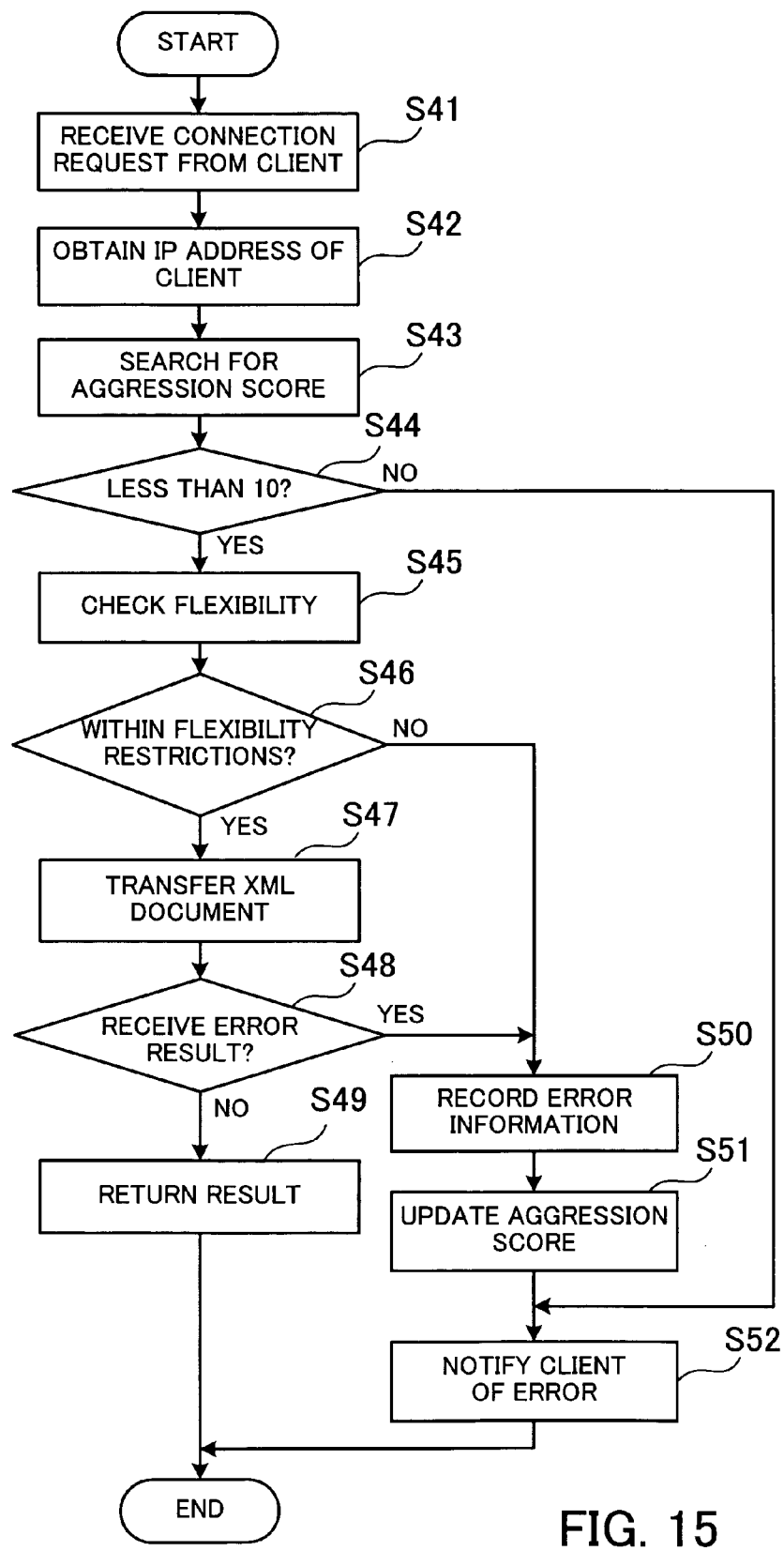
FIG. 15 is a flowchart showing a processing procedure in the third embodiment.

FIG. 15 is a flowchart showing a processing procedure in the third embodiment. This procedure will be described based on the flowchart.

[Step S41] The client identification unit 410 of the public server 400 receives a connection request for transfer of an XML document from a client.

[Step S42] The client identification unit 410 obtains the IP address of the client. The client identification unit 410 gives the IP address to the connection restriction unit 420.

[Step S43] The connection restriction unit 420 obtains the contents of the aggression score table 422 from the error information management unit 440 to search for the aggression score corresponding to the IP address.

[Step S44] The connection restriction unit 420 determines whether the aggression score obtained in Step S43 is less than 10. When yes, the process goes on to step S45. At this time, the connection restriction unit 420 gives the IP address to the flexibility check unit 430. When no, on the contrary, the process goes on to step S52.

[Step 45] The flexibility check unit 430 receives the XML document from the client to determine whether the XML document satisfies the restrictions defined in the requirements table 431.

[Step S46] The flexibility check unit 430 determines whether the received XML document has some items exceeding the restrictions. When all items are within the restrictions, the process goes on to step S47. When at least one item exceeds the restrictions, the process goes on to S50.

[Step S47] The flexibility check unit 430 transfers the XML document to the XML processing server 200*a*. Then the XML document is given to the analysis unit 220 to be analyzed and processed. If the analysis unit 220 detects an error, it notifies the public server 400 of the error.

[Step S48] The flexibility check unit 430 receives a processing result from the analysis unit 220 and determines whether the result indicates an error. When the result shows an error, the process goes on to step S50; and the process goes on to step S49, otherwise.

[Step S49] The flexibility check unit 430 returns the processing result to the client. Then this procedure ends.

[Step S50] The flexibility check unit 430 recognizes the violation on the flexibility restrictions or that an error has been detected by the analysis unit 220, and gives the error information management unit 440 error information including the IP address of the sending client of the XML document, the details of the error and the corresponding aggression point. The error information management unit 440 records the received error information in the error log 441.

[Step S51] The error information management unit 440 updates the aggression score in the aggression score table 442 based on the error information recorded in the error log 441.

[Step S52] The connection restriction unit 420 or the flexibility check unit 430 notifies the client of the error. Specifically, when the aggression score was confirmed to be 10 or greater in step S44, the connection restriction unit 420 makes the error notification. When the violation of the flexibility restrictions was detected in step S46 or when an error result was returned in step S48, the flexibility check unit 430 makes the error notification. Then this procedure ends.

As described above, after the aggression score of a client becomes 10 or greater, access from the client can be rejected.

Now assume a case where the client 60 successively sends XML documents 61, 62, and 63 to the public server 400. The XML document 61 is rejected by the flexibility check unit 430 due to an error (violation of flexibility restrictions). The XML document 62 is rejected by the analysis unit 220. The XML document 63 is valid data. In addition, the error log 441 and the aggression score table 442 in FIG. 13 and FIG. 14 are used as those before the client 60 sends the XML documents 61 to 63.

When the client 60 sends the XML document 61, the client 60 sends a connection request to the public server 400 over the network 10. The client identification unit 410 obtains the IP address of the client. Then connection restriction unit 420 searches the aggression score table 442 for the aggression score of the client 60. At this time, since the score is less than 10, the connection restriction unit 420 allows the connection from the client 60.

The flexibility check unit 430 receives the XML document 61 to determine whether the XML document 61 is within the flexibility restrictions. Because an error is detected, the flexibility check unit 430 gives the error information management unit 440 error information including the IP address of the client 60, the details of the error, and the corresponding aggression point "3". The error information management unit 440 records the received error information in the error log 441 and updates the aggression score table 442. The flexibility check unit 430 notifies the client 60 of this error.

Then when the client 60 sends the XML document 62, the client 60 sends a connection request to the public server 400 over the network 10. The client identification unit 410 obtains the IP address of the client 60. The connection restriction unit 420 searches the aggression score table 442 for the aggression score of the client 60. At this time, since the score is less than 10, the connection restriction unit 420 allows the connection from the client 60.

The flexibility check unit 430 receives the XML document 62 and determines whether the document 62 is within the flexibility restrictions. Since an error is not detected, the public server 400 transfers the XML document 62 to the XML processing server 200a. The analysis unit 220 analyzes the XML document 62. Since an error is detected, the analysis unit 220 returns the IP address of the client and the details of the error to the flexibility check unit 430. The flexibility check unit 430 obtains an aggression point "1" corresponding to the error from the requirements table 431, and gives the error information management unit 440 error information including the IP address of the client, the details of the error, and the aggression point. The error information management unit 440 records the received error information and updates the aggression score table 442. In addition, the flexibility check unit 430 notifies the client 60 of this error.

Since the processes of the two XML documents 61 and 62 were completed, the error log 441 and the aggression score table 442 were updated.

FIG. 16 shows an example of the updated error log. Different from the state shown in FIG. 13, the error log 441 newly includes the error details indicating the invalid length of an element name (aggression point is "3") and the invalid length of an attribute value (aggression point is "1") in association with the client IP address "10.35.86.66".

Figure 17:
FIG. 17 shows an example of an updated aggression score table.

FIG. 17 shows an example of the updated aggression score table. The aggression score table 442 has an aggression score of "10" updated from "6" (shown in FIG. 14), for the client IP address "10.35.86.66".

When the client 60 sends the XML document 63 in this situation, the client 60 sends a connection request to the public server 400 over the network 10. The client identification unit 410 obtains the IP address of the client. The connection restriction unit 420 searches the aggression score table 442 for the aggression score of the client 60. Since the score is 10 or greater, the connection restriction unit 420 rejects the connection from the client 60 and notifies the client 60 of this error.

By recording an aggression point when an error happens and restricting connections from clients as described above, clients can be prevented from repeated invalid accesses.

As a modification of this third embodiment, a priority determination unit can be additionally provided for calculating an aggression score from past error information for every client and determining the priorities of clients based on the scores.

Further, as another modification of this third embodiment, such a system can be provided in that restrictions set by the flexibility check module are eased for clients with predetermined special IP addresses. For example, since clients who have contracts to use the system have good credit, the flexibility check module can performs light checking. Because other unspecified clients possibly make attacks, strict restrictions can be set.

Furthermore, in a method of identifying a client based on an IP address as in the case of the third embodiment, IP address spoofing cannot be detected. To avoid this spoofing and keep more security, another module for identifying a client can be provided. For example, a client identification module for identifying a client based on a user name and a password is provided. By providing an advanced identification mechanism of such a client identification module, a strong system can be constructed.

Furthermore, in this third embodiment, although the analysis unit 220 of the XML processing server 200a notifies the flexibility check unit 430 of a detected error so as to obtain an aggression point corresponding to this error, aggression points corresponding to errors can be defined in the analysis unit 220. That is, a requirements table similar to the requirements table 431 shown in FIG. 12 is provided in the analysis unit 220. The requirements table of the analysis unit 220 may include at least items to be checked by the analysis unit 220, allowable ranges, and aggression points.

The relationships between error information and aggression points will be now described. Normally, honest users operating normal clients send XML documents after fully verifying that they are correct. Therefore, basically, little errors happen and few XML data are in formats very different from a format desired by a server.

The followings are cases in which XML data sent from clients cause errors. Then setting of aggression points for these cases will be described.

First case: XML data exceeds flexibility restrictions
Second case: XML is not well-formed
Third case: XML is not appropriate (error in DTD, XML Schema or the like)
Fourth case: Data has meaningful errors The first case happens when an XML document exceeds flexibility restrictions defined by the flexibility check unit. Even if an XML document creation program has bags, normal clients create such documents with a very low possibility. Therefore, when this first case happens, the sending client can be identified as an attacker sending an attacking XML document on purpose. Therefore, an aggression point for this case should be set high. In addition, an aggression point for an error with a high danger such as large data size can be set to a higher point.

The second case is also an error that is not usually caused by honest clients. XML documents are usually created by a program. Therefore, XML documents which are not well-formed are sent with a low possibility. Further, client sides detect this error through test with a high possibility. Therefore, an aggression point for this case should be set high.

The third case is an error which is detected through validly identification by an XML parser. The fourth case is an error which is detected when a program processing an XML document detects a meaningful error in data after completing the XML analysis. Honest clients cause these two cases by sending wrong XML documents by mistake with a high possibility. Therefore, aggression points for these cases can be set to points lower than those of the first and second cases, but not too low. This is because, if a honest client repeatedly sends error data, this action may be an attack. In addition, a client making an attack may such data.

By the way, in the above embodiments, the public server and the XML processing server are separately provided. However, the functions of the public server can be provided in the XML processing server.

Further, in the above embodiments, one client identification unit, one connection restriction unit, and one flexibility check unit are provided in the public server. However, a plurality of each unit can be provided.

Furthermore, this embodiment has been described by using XML documents as structured documents. However, other structured documents such as HTML documents can be used.

The above-described processing functions are actually implemented on a computer with a data entry restriction program describing processing contents of the intended functions of a public server. This data entry restriction program is stored in a computer-readable storage medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical discs include digital versatile discs (DVD), DVD-random access memory (DVD-RAM), compact disc read-only memory (CD-ROM), CD-recordable (CD-R), CD-rewritable (CD-RW). Magneto-optical storage media include magneto-optical discs (MO).

To distribute the data entry restriction program, portable storage media, such as DVD and CD-ROM, are used. Network-based distribution of the data entry restriction program has also become popular, in which the master data entry restriction program stored in a server computer is downloaded to user computers via a network.

Each computer stores the data entry restriction program in its local storage unit, which has previously been installed from a portable storage medium or downloaded from a server computer. The computer performs intended functions by executing the data entry restriction program read out of the local storage unit. As an alternative way of program execution, the computer may execute the data entry restriction program, reading out the data entry restriction program directly from a portable storage medium. Another alternative method is that the computer dynamically downloads the data entry restriction program from a server computer when they are demanded and executes them upon delivery.

As described above, in this invention, error information is stored when a structured document sent from a client does not meet flexibility requirements, and structured documents from the clients are rejected after the error information exceeds prescribed limits. Therefore, flexibility of structured documents in a format with great flexibility can be limited easily. As a result, entry of invalid structured documents created by making use of the great flexibility can be rejected, thus keeping safety of processing functions such as analysis of structured documents.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data entry restriction method for determining whether to accept or rejected entered structured markup documents, comprising the steps of:

Comparing a structure of a structured markup document entered with previously defined flexibility requirements indicating allowable ranges for document structure;

Adding, when the structured markup document entered does not meet the flexibility requirements which define a numeric value indicative of aggression for every item, a numeric value indicative of aggression corresponding to an item violated by the structured markup document entered to a total calculated by summing numeric values indicative of aggression of past structured markup documents sent from the client computer, the total associated with an IP address of a client computer that is a sender of the structured markup document entered;

Extracting the IP address from a connection request for transfer of a structured markup document from the client computer when the connection request is received from the client computer; and Rejecting connection requests which include the IP address of the client computer without receiving a message following the connection requests and without establishing a connection for receiving the structured markup documents, when a total of the numeric values indicative of aggression associated with the IP address becomes a prescribed value or greater.

2. The data entry restriction method according to claim 1, wherein said rejecting rejects the connection request from the client computer after a number of errors caused by past structured markup documents from the client computer becomes a prescribed number or greater.

3. The data entry restriction method according to claim 1, wherein said comparing discards the structured markup document entered when the structure of the structured markup document does not meet the flexibility requirements.

4. A data entry restriction apparatus for determining whether to accept or reject entered structured markup documents, comprising:

A processor; and

A memory storing computer-readable instructions which are executed by the processor, Wherein the processor performs the functions including:

Executing a flexibility check unit to compare a structure of a structured markup document with previously defined flexibility requirements indicating allowable ranges for document structure;

Executing an error information recording unit to add, when the structured markup document entered does not meet the flexibility requirements which define a numeric value indicative of aggression for every item, a numeric value indicative of aggression corresponding to an item violated by the structured markup document entered to a total calculated by summing numeric values indicative of aggression of past structured markup documents sent from the client computer, the total associated with an IP address of a client computer that is a sender of the structured markup document entered;

Executing an IP address extracting unit to extract the IP address from a connection request for transfer of a structured markup document from the client computer when the connection request is received from the client computer; and Executing a rejecting unit to reject connection requests which include the IP address of the client computer, without receiving a message following the connection requests and without establishing a connection for receiving the structured markup documents, when a total of the numeric values indicative of aggression associated with the IP address becomes a prescribed value or greater.

5. The data entry restriction apparatus according to claim 4, wherein said rejecting unit rejects the connection request from the client computer after a number of errors caused by past structured markup documents form the client computer becomes a prescribed number or greater.

6. The data entry restriction apparatus according to claim 5, wherein said flexibility check unit discards the structured markup document entered when the structure of the structured markup document does not meet the flexibility requirements.

7. A computer-readable recording medium storing a data entry restriction program to determine whether to accept or reject entered structured markup documents, the data entry restriction program causing a computer to execute functions comprising:

Comparing a structure of a structured markup document with previously defined flexibility requirements indicating allowable ranges for document structure;

Adding, when the structured markup document does not meet the flexibility requirements which define a numeric value indicative of aggression for every item, a numeric value indicative of aggression corresponding to an item violated by the structured markup document entered to a total calculated by summing numeric values indicative of aggression of past structured markup documents sent from the client computer, the total associated with an IP address of a client computer that is a sender of the structured markup document entered;

Extracting the IP address from a connection request for transfer of a structured markup document from the client computer when the connection request is received from the client computer; and Rejecting connection requests which include the IP address of the client computer, without receiving a request following the connection requests and without establishing a connection for receiving the structured markup documents, when a total of the numeric values indicative of aggression associated with the IP address becomes a prescribed value or greater.

8. The computer-readable medium of claim 7, wherein said rejecting rejects the structured markup documents from the client after a number of errors caused by past structured markup documents from the client becomes a prescribed number or greater.

9. The computer-readable medium of claim 7, wherein said comparing discards the structured markup document entered when the structure of the structured markup document does not meet the flexibility requirements.

* * * * *

UNITED STATES PATENT AND TRADEMARK OFFICE
CERTIFICATE OF CORRECTION

PATENT NO. : 7,949,940 B2  
APPLICATION NO. : 10/864536  
DATED : May 24, 2011  
INVENTOR(S) : Uchida Page 1 of 1

It is certified that error appears in the above-identified patent and that said Letters Patent is hereby corrected as shown below:

Col. 18, Line 19  Delete "rejected" and insert --reject--
Claim 1

Col. 19, Line 24  Delete "form" and insert --from--
Claim 5

Signed and Sealed this
Ninth Day of August, 2011

David J. Kappos
*Director of the United States Patent and Trademark Office*